Figure 1:
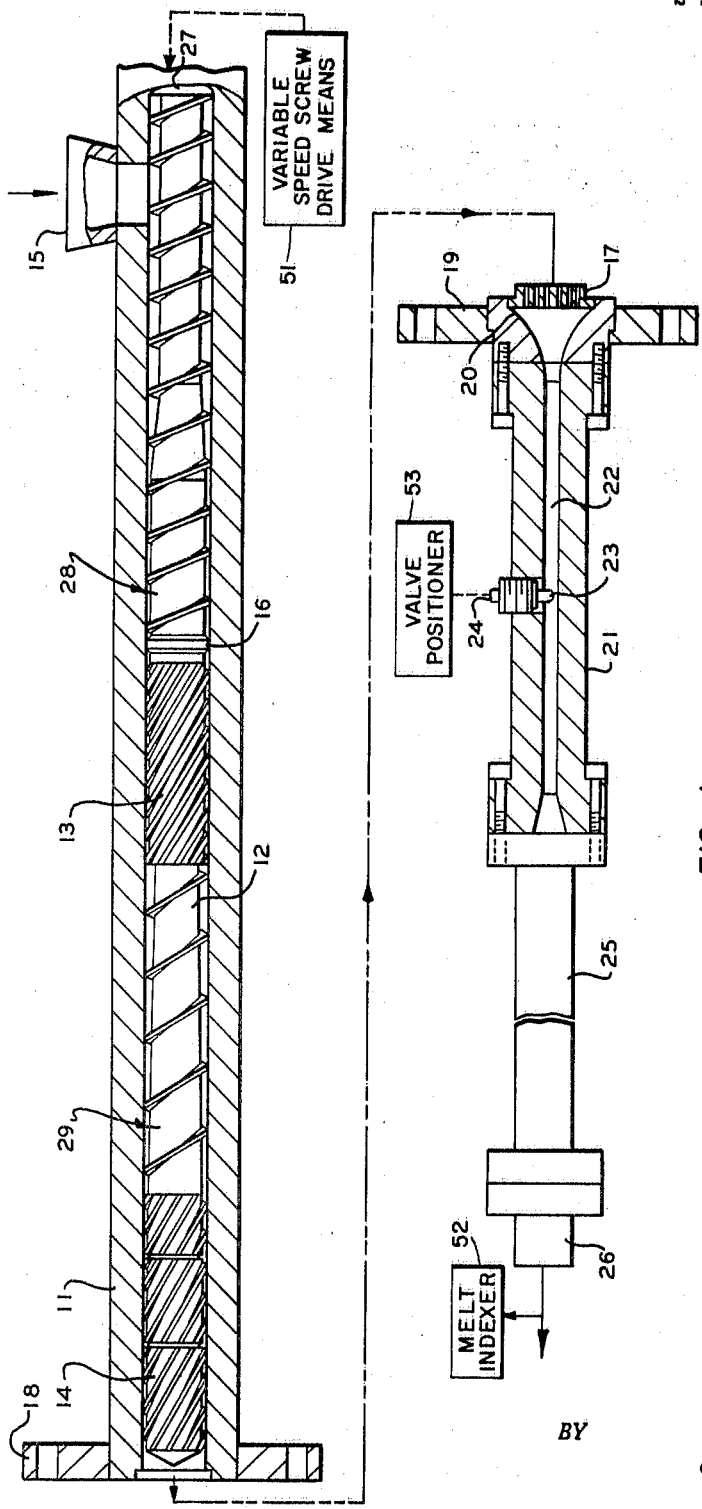

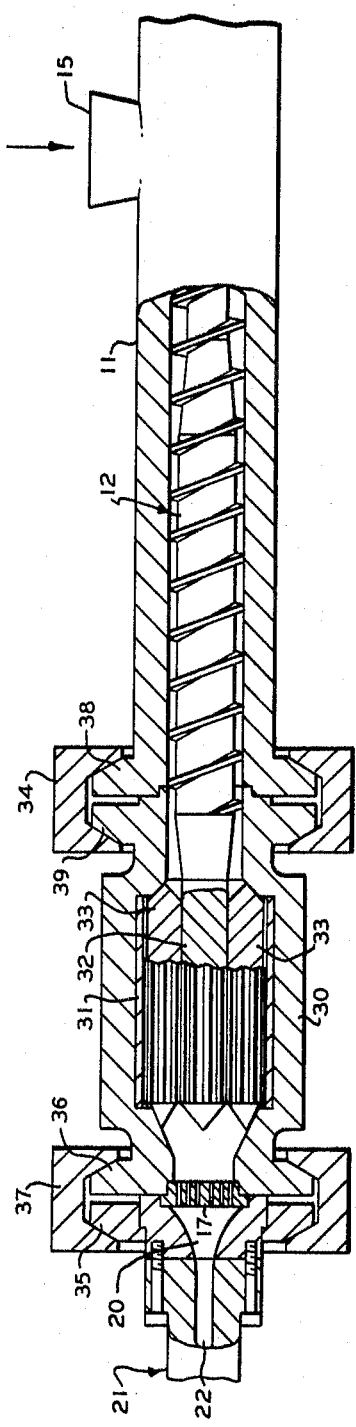

United States Patent Office 3,248,469
Patented Apr. 26, 1966

3,248,469
HIGH SHEAR VISBREAKING METHOD
AND APPARATUS
Edward J. Kosinsky and Eli Solop, Bartlesville, Okla.,
and Paul H. Wagner, Borger, Tex., assignors to Phillips
Petroleum Company, a corporation of Delaware
Filed Aug. 28, 1961, Ser. No. 134,421
12 Claims. (Cl. 264—349)

This invention relates to the visbreaking of thermoplastics. In one of its aspects, the invention relates to the visbreaking of polyolefins. In another aspect, the invention relates to visbreaking thermoplastic materials by extruding the material through an Egan milling head. In yet another aspect, the invention relates to visbreaking thermoplastic materials by passing the materials through an extruder provided with a double Dulmage screw. In a further aspect, the invention relates to the utilization of an extruder provided with a milling head and a back pressure valve to visbreak thermoplastics. In yet another aspect, the invention relates to visbreaking of thermoplastic materials by extruding the materials through an Egan milling head with the back pressure and residence time controlled by a valve positioned at the outlet of the Egan milling head. A still further aspect of the invention relates to visbreaking polyolefins by employing an extruder with a special screw embodying two Dulmage sections, and an externally controlled pressure valve. In another aspect, the invention relates to visbreaking polyolefins with a feed-screw containing two high shear sections. In yet another aspect of the invention, it relates to the utilization of a feedscrew containing two shear sections integral with the screw and a restriction incorporated into the screw upstream of the first shear section to visbreak polyolefins by applying high shear and a high temperature to the polyolefins. In another aspect, the invention relates to a method and means for increasing the residence time of a thermoplastic material in a visbreaking zone. In yet another aspect, the invention relates to a method and means for visbreaking polyolefins by the application of high shear and a high temperature to the polyolefins. In a further aspect, this invention relates to means for restricting the flow of thermoplastic materials from the extruder so that the materials are exposed to the high shear of the screw for a longer period of time. In another aspect, the invention relates to visbreaking of polyolefins through the utilization of a feedscrew containing two integral high shear sections and a restriction incorporated into the feedscrew upstream of the first shear section, the restriction being of sufficient length to permit holding the polymer in the first stage shear section to increase the heat transfer to the polymer by conduction and mechanical shearing. In another aspect, the invention relates to controlling the throughput and the screw speed on a high shear visbreaker to produce a visbroken polymer having a predetermined melt index.

It is known that high molecular weight polyethylene can be converted into lower hydrocarbons of a desired chain length by the process of pyrolysis wherein the hydrocarbon chain is partially broken down by thermal treatment. The pyrolysis or visbreaking of polyethylene can be accomplished by heating the polyethylene in an enclosed stirred vessel under controlled conditions and containing an inert gas. Another method of accomplishing the pyrolysis of polyethylene is to pass molten polyethylene through a tube heated to a controlled temperature in the absence of air. The rate of flow and the size of the tube are such to permit the polyethylene to remain in the heated zone as long as the pyrolysis is proceeding at an appreciable rate.

Visbroken polymers, when compared to similar solution process products, exhibit relatively high flow at low pressures. The superior flow at low pressures leads to a good knitting of weld lines and improved surface gloss, particularly in extruded items. Visbroken polymers having a high melt index are suitable for use in injection molding applications where they offer a combination of good processability, toughness, and excellent surface. The visbroken polymers are useful for pipe and wire applications due to their improved processability and excellent flow at a low pressure which permits extrusion of an extremely smooth and glossy pipe. Tubular film made from visbroken polymers offers advantages over a similar solution polymer in stress-strain properties and tear strength as well as possessing improved sparkle and clarity. Visbroken polymers are also suitable for use as a paper coating.

While visbroken polymers obtained by prior art methods of pyrolysis have been suitable for many applications, they have the disadvantage of being subjected to excessive thermal decomposition.

Accordingly, it is an object of this invention to provide a new method and apparatus for visbreaking thermoplastic materials. Another object of this invention is to provide means for visbreaking thermoplastic materials at high production rates without the requirement of an excessively long visbreaking zone. Another object of this invention is to provide a method and means for visbreaking thermoplastic materials without the necessity for the application of undesirable high surface temperatures to the thermoplastic materials. Another object of the invention is to provide means for heating a body of thermoplastic material to a uniformly elevated temperature in a short time interval. Yet another object of this invention is to provide a method and apparatus for producing a visbroken polymer having a predetermined melt index. Another object of this invention is to provide a method and apparatus for controlling the melt index of visbroken polymers. A further object of this invention is to provide a method and apparatus for producing visbroken polymers having improved characteristics. Yet another object of this invention is to provide a method and means for causing the polymer to be exposed to a greater length of high shear by the milling head in the extrusion of the polymer through a milling head. Still further, an object of this invention is to provide a method and means for controlling the pyrolysis of thermoplastic materials.

Other aspects, objects, and the several advantages of the invention are apparent from a study of this disclosure, the drawing, and the appended claims.

According to the invention, there is provided an apparatus for visbreaking thermoplastic materials which comprises an extruder, a feedscrew mounted coaxially with the extruder, a first and second shear sections integral with the feedscrew, a restriction incorporated into the feedscrew upstream of the first shear section, and an externally controlled pressure valve mounted on the output end of the extruder.

According to another embodiment of the invention, there is provided an apparatus for visbreaking thermoplastic materials which comprises an extruder, a feedscrew mounted coaxially within the extruder cylinder, a mixer mounted coaxially with the feedscrew at the output end of the feed screw, and an externally controlled pressure valve mounted in the output end of the mixer.

Still further, according to the invention, there is provided a method of visbreaking thermoplastic materials which comprises passing the thermoplastic materials to a shearing zone, controlling the rate of input of the thermoplastic materials to a shearing zone, subjecting the material to high shearing action in the shearing zone, passing the material thus sheared to an extrusion zone, extruding the sheared material in the extrusion zone, and controlling the rate of withdrawal of extruded material from the extrusion zone.

FIGURE 1 is a longitudinal, vertical section through a part of the cylinder of a screw type extrusion machine and a shearing element constructed in accordance with this invention, parts of the feedscrew and shearing element being shown in elevation. FIGURE 2 is a longitudinal vertical section through a part of the cylinder of a screw type extrusion machine and a shearing element constructed in accordance with another embodiment of this invention, parts of the feedscrew and the shearing element being shown in elevation.

Referring now to the drawing, and to FIGURE 1 in particular, there is shown a cylindrical housing 11 of a conventional extrusion machine having feedscrew 12 mounted coaxially therein. Forming an integral part of feedscrew 12 are first feedscrew section 28, first stage shear section 13, second feedscrew section 29, and second stage shear section 14. The helical grooves of first shear section 13 can be continuous from one end of the section to the other while second shear section 14 can be similar to the Dulmage mixing head as disclosed in U.S. Patent 2,453,088. Housing 11 can be surrounded by any suitable means for heating or cooling (not shown) as required.

First screw section 28 can have a compression ratio in the range of about 2.5:1 to about 4:1 while second screw section 29 can have a compression ratio in the range of about 1.5:1 to about 3:1. The clearance between the feedscrew and housing 11 can vary in the range of about 0.001 inch to about 0.005 inch per inch of nominal screw diameter. The length of first stage shear section 13 can vary from about 2 to about 4 screw diameters and can be located from about 10 to about 15 screw diameters downstream of feed port 15. The lead length of the helical grooves in first stage shear section 13 can vary from about 1.5 to about 2.0 times the length of that section while second stage shear section 14 can vary in length from about 3 to about 5 screw diameters.

Upstream of first shear section 13, restriction 16 is incorporated into feedscrew 12. Restriction 16 is of a sufficient length to permit holdup of the thermoplastic material in first shear section 13, thus permitting a greater heat transfer to the thermoplastic material by conduction and mechanical shearing. The clearance between restriction 16 and housing 11 can vary in the range of about 0.001 inch to about 0.005 inch per inch of nominal screw diameter. The close-fitting restriction also aids by imparting high shear to the polymer. Beyond the end of feedscrew 12 in the extrusion path is strainer plate and screen pack 17, held in place across the discharge end of housing 11 by fixed head flange 18 and movable die gate 19. Die gate 19 has a streamlined transition passageway or extrusion orifice 20 located therein. An extrudate pressure control valve 21 having passageway 22 therethrough is secured to gate 19 by any suitable means such that passageway 22 is substantially coaxial with extrusion orifice 20. The extrudate pressure control valve 21 comprises a plug member 23 mounted in the housing of extrudate pressure control valve 21 and adapted to vary the opening in passageway 22. Plug member 23 is controlled by externally controlled plug stem 24. Any desired type of apparatus, such as a polymer cooling tube 25 and strand die 26, can be attached to the exit end of extrudate pressure control valve 21.

Thermoplastic material is fed into housing 11 through feed port 15. Feedscrew 12 is rotated by any suitable means 27 in such a direction as to advance the thermoplastic material to the left as viewed in FIGURE 1. Restriction 16 controls the rate of passage of the thermoplastic material from the first screw section 28 of feedscrew 12 into first shear section 13. The thermoplastic material is subjected to visbreaking conditions in first shear section 13 through the transfer of heat to the thermoplastic material by conduction and due to the high mechanical shearing action of the screw threads in first shear section 13. The thermoplastic material is removed from first shear section 13 and introduced into second shear section 14 by the second screw section 29 of feedscrew 12. The thermoplastic material is then subjected to further visbreaking conditions in second shear section 14. Extrudate pressure control valve 21 controls the rate of flow of thermoplastic material from the extruder so that the thermoplastic material is subjected to the high shearing action of shearing sections 13 and 14 for a longer period of time, thus permitting a higher degree of visbreaking. Extrudate pressure control valve 21 can be a plug type valve as shown in FIGURE 1 or it can be any other suitable valve such as a needle type valve with a tapered sealing surface, a straight through valve, or a right angle flow valve.

Referring now to FIGURE 2, there is shown a modified version of the invention wherein the shearing section is embodied in an apparatus such as the Egan milling head disclosed in U.S. Patent 2,785,438. Shear section 30 comprises an internal gear 31 mounted within the shearing chamber by any suitable means to prevent rotation of the internal gear, a drive pinion 32 which is connected by any suitable means to feedscrew 12 to be driven thereby, and a plurality of floating pinions 33 meshing with and disposed between drive pinion 32 and internal gear 31, and which rotate free from each other. Flange 38 of extruder housing 11 is secured to flange 39 of shear section 30 by suitable means such as clamp 34. Die base 35 is secured to flange 36 of shear section 30 by suitable means such as clamp 37. Bolted flanges can be used instead of clamps 34 and 37, if desired. Extruder housing 11 and shear section 30 can be provided with suitable heating or cooling means (not shown).

The operation of the apparatus of FIGURE 2 is similar to the operation of the apparatus of FIGURE 1 in that the thermoplastic material is introduced into extruder housing 11 through feed port 15, and feedscrew 12 is driven by suitable means to cause movement of the thermoplastic material from feed port 15 through housing 11 to shear section 30. Extrudate pressure control valve 21 causes a buildup of the thermoplastic material in shear section 30 so that the thermoplastic material is visbroken to a higher degree than would be accomplished through the action of shear section 30 without extrudate pressure control valve 21.

Any gear head or other type of shearing device can be utilized in the combination of an extruder, a shearing device, and an extrudate pressure control valve according to this invention.

By controlling the throughput and the screw speed of the apparatus such as disclosed in FIGURES 1 and 2, thermoplastic material can be visbroken to a predetermined melt index. The screw speed can be controlled by utilizing a suitable variable speed screw drive means 51 (FIGURE 1), for example a U.S. Varidrive, a D.C. Reliance or a water-cooled eddy current clutch drive.

The extrudate pressure control valve 21 can be adjusted manually or can be adjusted automatically through proper control loops that adjust the valve 21 according to the melt index of the extrudate as determined by melt indexer 52, the temperature inside the shearing section, or some other variable measurement of the polymer. The output value from melt indexer 52 can be applied to the control input of valve positioner 53.

A more comprehensive understanding of the invention can be obtained by referring to the following illustrative examples which are not intended, however, to unduly limit the invention.

*Example I*

Polyethylene prepared according to the process described in the copending application of G. T. Leatherman et al., Serial No. 590,567, filed June 11, 1956, and having a high load melt index of 1.3 was visbroken by passing the polymer through a 3½″, 24:1 L/D, non-vented extruder using the screw configuration and pressure control valve of FIGURE 1. The polymer passing through the screw with the double Dulmage section was visbroken to a material having a melt index of 16.1 at a rate of 97 lbs./hr. at a screw speed of 95 r.p.m. The externally controlled back pressure valve was approximately 50 percent closed.

*Example II*

Polyethylene prepared according to the process of Hogen et al., U.S. Patent 2,825,721 was visbroken in the 2½″, 24:1 L/D extruder and the double Dulmage section was replaced with an Egan milling head having 8 gear pins (FIGURE 2). A 3.5:1 C.R. metering type screw was used with the Egan milling head. At a 97 r.p.m. screw speed and with the ¼ inch extrudate pressure control valve approximately 97 percent closed, an 0.96 density polyethylene having a melt index of 5 was visbroken to 14.6 melt index at 94 lbs./hr.

Melt index in the above examples was determined in the first example by ASTM method D-1238-57T using Condition F, wherein melt index was determined at 190° C. and a load of 21,600 grams. The melt index of the polymer used in Example II was determined by ASTM method D-1238-52T.

Reasonable variation and modification are possible within the scope of the foregoing disclosure, the drawing, and the appended claims to the invention, the essence of which is that there is provided an apparatus for visbreaking thermoplastic material to a desired predetermined melt index which comprises an extruder, a shear section mounted coaxially with the feedscrew, and an extrudate pressure control valve mounted on the output of the shear section; and a method of visbreaking thermoplastic materials which comprises controlling the rate of input of feed to a shearing zone, subjecting the material to high shearing action in said zone, passing the sheared material to an extrusion zone and therein extruding the sheared material, and controlling the rate of withdrawal of extruded material from said extrusion zone.

We claim:

1. Apparatus for visbreaking thermoplastic material without subjecting the surface of the material to undesirable elevated temperatures which comprises an extruder housing; a screw mounted coaxially to said extruder housing and surrounded by said extruder housing, said screw comprising, in the order named, proceeding from the upstream end of said screw, a first feedscrew section, a first shear section, a second feedscrew section, and second shear section; a restriction incorporated into said screw upstream of said first shear section; an externally controlled pressure valve housing having a passageway therethrough; valve means mounted in said valve housing and adapted to vary the opening of said passageway; and means for mounting said valve housing on said extruder housing so that said passageway is substantially coaxial with said screw.

2. Apparatus for visbreaking thermoplastic material which comprises a feedscrew, an extruder housing mounted coaxially with said feedscrew and surrounding said feedscrew, a milling head mounted on said feedscrew at the output end of said feedscrew and substantially coaxially with said feedscrew, an externally controlled pressure valve mounted on the output end of said extruder housing, and means for controlling the speed of said feedscrew to maintain a predetermined melt index of the extruded material.

3. Apparatus for visbreaking thermoplastic material which comprises an extruder housing, a feedscrew mounted coaxially with said extruder housing and surrounded by said extruder housing, a drive pinion mounted on the output end of said feedscrew and substantially coaxially with said feedscrew, an internal gear mounted coaxially with said drive pinion and surrounding said drive pinion, a plurality of floating pinions meshing with and disposed between said drive pinion and said internal gear and which rotate free from each other, an externally controlled pressure valve mounted on the downstream side of said internal gear, and means for controlling the speed of said feedscrew to maintain a predetermined melt index of the extruded material.

4. Apparatus for visbreaking thermoplastic material which comprises an extruder housing having a feed end and a discharge end; a screw mounted coaxially with said extruder housing and surrounded by said extruder housing, said screw comprising in the order named, proceeding from the feed end of said housing, a first feedscrew section, a first shear section, a second feedscrew section, and a second shear section, said first screw section having a compression ratio in the range of about 2.5:1 to about 4:1, said first shear section having a length in the range of from about 2 to about 4 screw diameters and located from about 10 to about 15 screw diameters downstream of said feed end of said extruder housing, said first shear section having helical grooves with a lead length in the range from about 1.5 to about 2.0 times the length of said first shear section, said second screw section having a compression ratio in the range of about 1.5:1 to about 3:1, said second shear section having a length in the range from about 3 to about 5 screw diameters, the clearance between said screw and said extruder housing being in the range of about 0.001 inch to about 0.005 inch per inch of nominal screw diameter, said helical grooves of said first shear section being continuous from one end to the other end of said first shear section, said second shear section having a plurality of circumferentially disposed neck-like constrictions disposed at intervals therealong, said constrictions having a depth equal to that of said helical grooves of said first shear section; a restriction incorporated into said screw upstream of said first shear section, said restriction having a length sufficient to permit holdup of material in said first shear section, the clearance between said restriction and said extruder housing being in the range of about 0.001 inch to about 0.005 inch per inch of nominal screw diameter; and an externally controlled extrudate pressure control valve mounted in said discharge end of said extruder housing, and means for controlling the speed of said feedscrew to maintain a predetermined melt index of the extruded material.

5. A method of visbreaking thermoplastic material without subjecting the surface of the material to undesirable elevated temperatures which comprises passing said thermoplastic material to a shearing zone, controlling the rate of input of said material to said shearing zone, subjecting said material to high shearing action in said shearing zone, passing the material thus sheared to an extrusion zone, extruding said sheared material in said extrusion zone, and controlling the back pressure on said extrusion zone to maintain said material in said shearing zone for a time sufficient to effect substantial visbreaking of said material in said shearing zone.

6. A method in accordance with claim 5 wherein the step of controlling the back pressure on said extrusion zone comprises regulating the back pressure on said extrusion zone to maintain a predetermined melt index of the extruded material.

7. A method in accordance with claim 5 wherein the step of controlling the rate of input comprises regulating the rate of input of material to said shearing zone responsive to the melt index of the extruded material to maintain said melt index substantially constant at a predetermined value.

8. A method in accordance with claim 5 wherein said thermoplastic material comprises polyethylene.

9. A method for visbreaking thermoplastic material without subjecting the surface of said material to undesirable elevated temperatures which comprises introducing said material into the feed port of an extruder apparatus comprising an extruder housing having a feed port in the upstream end thereof; a screw mounted coaxially with said extruder housing and surrounded by said extruder housing, said screw comprising, in the order named, proceeding from the feed port end of said screw, a first feedscrew section, a first shear section, a second feedscrew section, and a second shear section; a restriction incorporated into said screw upstream of said first shear section; an externally controlled pressure valve housing having a pasageway therethrough; valve means mounted in said valve housing and adapted to vary the opening of said passageway; and means for mounting said valve housing on said extruder housing so that said passageway is substantially coaxial with said screw; rotating said screw to force said material from said feed port through the annulus between said screw and said extruder housing toward and through said passageway; and manipulating said valve means to maintain said material in said first and second shear sections for time sufficient to effect substantial visbreaking of said material.

10. A method for visbreaking thermoplastic material which comprises introducing said material into the feed port of an extruder apparatus comprising a feedscrew, an extruder housing mounted coaxially with said feedscrew and surrounding said feedscrew and having a feed port at the upstream end of said extruder housing, a milling head mounted within said extruder housing at the output end of said feedscrew, and an externally controlled pressure valve mounted on the output end of said extruder housing, rotating said feedscrew to force said material from said feed port through the annulus between said feedscrew and said extruder housing toward and through said milling head, and manipulating said valve to maintain said material in said milling head for a time sufficient to effect substantial visbreaking of said material.

11. A method for visbreaking thermoplastic material which comprises introducing said material into the feed port of an extruder apparatus comprising a feedscrew, an extruder housing mounted coaxially with said feedscrew and surrounding said feedscrew and having a feed port at the upstream end of said extruder housing, a milling head mounted within said extruder housing on said feedscrew at the output end of said feedscrew and substantially coaxially with said feedscrew, and an externally controlled pressure valve mounted on the output end of said extruder housing, rotating said feedscrew to force said material from said feed port through the annulus between said feedscrew and said extruder housing toward and through said milling head, and manipulating said valve to maintain said material in said milling head for a time sufficient to effect substantial visbreaking of said material and regulating the rotational speed of said feedscrew to produce a visbroken material having a predetermined melt index.

12. A method for visbreaking thermoplastic material which comprises introducing said material into the feed port of an extruder apparatus comprising an extruder housing having a feed port at the upstream end thereof; a feedscrew mounted coaxially with said extruder housing and surrounded by said extruder housing; a milling head comprising a drive pinion mounted on the output end of said feedscrew and substantially coaxially with said feedscrew, an internal gear mounted coaxially with said drive pinion and surrounding said drive pinion, a plurality of floating pinions meshing with and disposed between said drive pinion and said internal gear and which rotate free from each other; and an externally controlled pressure valve mounted on the downstream side of said internal gear; rotating said feedscrew to force said material from said feed port through the annulus between said feedscrew and said extruder housing toward and through said milling head, and manipulating said valve to maintain said material in said milling head for a time sufficient to effect substantial visbreaking of said material.

References Cited by the Examiner

UNITED STATES PATENTS

| | | | |
|---|---|---|---|
| 2,480,615 | 8/1949 | Strain et al. | 18—48 |
| 2,753,595 | 7/1956 | Dulmage | 18—12 |
| 2,754,542 | 7/1956 | Henning | 18—12 |
| 2,785,438 | 3/1957 | Willert | 18—12 |
| 2,838,794 | 6/1958 | Munger et al. | 18—12 |
| 2,903,747 | 9/1959 | Wucher | 18—30 |
| 2,919,474 | 1/1960 | Cole | 18—48 |
| 2,935,502 | 5/1960 | Reding | 18—54 |
| 2,970,341 | 2/1961 | Mallory et al. | 18—12 |
| 3,050,084 | 8/1962 | Palfey | 18—12 |

ROBERT F. WHITE, *Primary Examiner.*

WILLIAM STEPHENSON, ALEXANDER H. BRODMERKEL, *Examiners.*